INVENTOR.
DONALD W. LYNCH
BY Derek P Lawrence
HIS ATTORNEY

United States Patent Office 3,217,423
Patented Nov. 16, 1965

3,217,423
CONTROL SYSTEM FOR CLOTHES DRYERS
Donald W. Lynch, Louisville, Ky., assignor to General Electric Company, a corporation of New York
Filed July 16, 1962, Ser. No. 209,841
4 Claims. (Cl. 34—45)

This invention relates to clothes drying machines, and more particularly to an automatic control system for insuring that the drying operation in such machines is ended when the clothes are at a reasonably low temperature so as to facilitate their handling.

At the present time, several domestic clothes drying machines are commercially available where the length of the heating cycle is controlled by the dryness of the clothes. Such machines are said to have automatic drying cycles, and such cycles are generally effected by use of a thermostatic control sensitive to the temperature of clothes in the machine. This is done on the basis that a predetermined rise in the clothes temperature indicates that the heat energy applied to the clothes is no longer being used to vaporize moisture from them, but instead is free to raise the temperature. In other words, such control systems utilize a predetermined temperature as a trip point for shutting off the means provided for heating the clothes. Depending upon the type of fabric being dried and the size of the load, either a single such occurrence may be sufficient or several such heating cycles may be required in a single drying sequence. The number of heating cycles is usually determined by having a timer run each time the heater shuts off, with the total length of timer operation being pre-selected.

It is an object of my invention to provide an improved clothes drying machine control system of the above type wherein, by the cooperation of the timer with the thermostatic control normally provided in such machines, the machine is caused to terminate operation at the lower reset temperature of the thermostatic control, i.e., at the point where the temperature has dropped enough so that, normally, the timer will shut off and the heaters will start to operate again.

In carrying out my invention in one form thereof, I provide a clothes dryer in which air moving means powered by an electric motor causes air to pass into and out of a chamber. A heater upstream of the chamber causes heating of the air and is operated alternatively with a timer provided for determining the total length of operation of the dryer. The timer is energized through an appropriate timer circuit; similarly, the heater is energized through a heater circuit, and the motor is energized through either one of first and second motor circuits.

A control thermostat is positioned to be responsive to the temperature of clothes in the chamber. This thermostat operates both a heater switch and a timer switch which respectively enable completion of the heater circuit and of the timer circuit during the drying operation. When a relatively high, or trip, temperature is reached by the clothes, the thermostat opens the heater switch and closes the timer switch; when a lower, or reset, temperature of the clothes is reached it causes the heater switch to be closed and the timer switch to be opened again.

In the heater circuit, there is provided a motor control switch which is responsive to motor operation so as to enable operation of the heater when the motor runs, and prevent operation of the heater when the motor does not run. The motor, in turn, is controlled through first and second switches operated by the timer and which are provided in the first and second motor circuits respectively. The timer causes the first switch to be closed throughout a drying operation until a brief period before the end thereof, as determined by the timer; at this time the first switch is opened. The second switch is kept open by the timer throughout the operation until the first switch opens. At about this time the second switch closes so as to maintain continued energization of the motor. The brief period at the end of the operation during which the second switch is closed and the first switch is open is selected so as to be longer than the length of time taken by the thermostat to cool from its relatively high temperature down to its lower temperature when substantially dry clothes are in the chamber.

With this structure, inclusion of the timer switch in the second motor circuit is series with the second switch permits the motor to be de-energized by the thermostat when it opens the timer switch after the first switch is opened and the second switch is closed. This insures that termination of the operation occurs when the temperature of the clothes contained in the chamber is at the lower reset point of the heater. At this time, they are much more easily handled by the operator than when the temperature is closer to the high, or trip, point of the thermostat.

The subject matter which I regard as my invention is particularly pointed out and distinctly claimed in the concluding portion of this specification. My invention, however, both as to organization and method of operation, together with further objects and advantages thereof, may best be understood by reference to the following description taken in conjunction with the accompanying drawings.

In the drawings, FIGURE 1 is a side elevational view of a clothes dryer incorporating my improved dryer control arrangement, the view being partly broken away and partly sectionalized to illustrate details;

Figure 1:
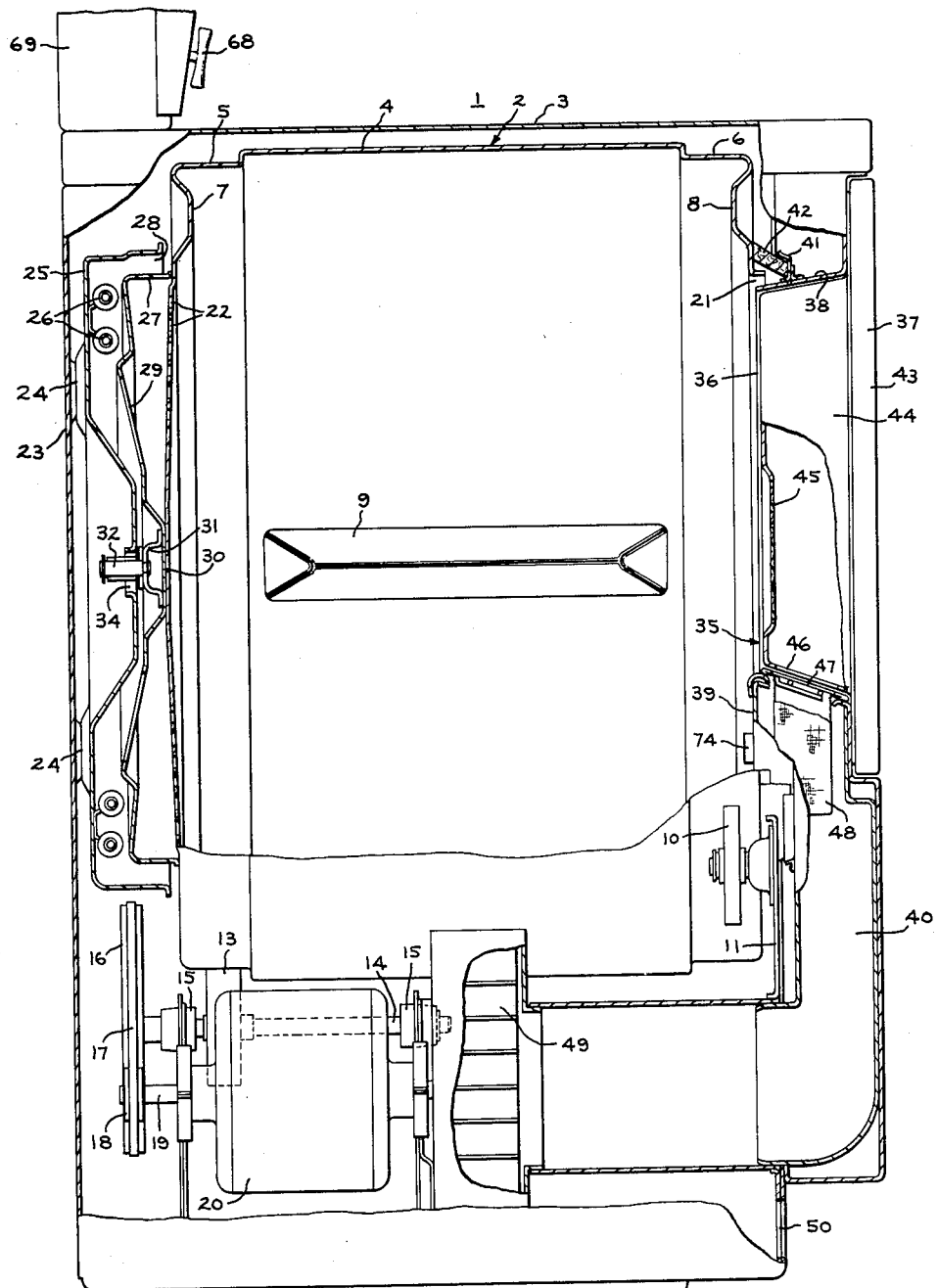

Referring now to FIGURE 1 of the drawings, I have shown therein a domestic clothes dryer 1 including a clothes tumbing container or drum 2 provided within a suitable outer casing or cabinet 3 which completely encloses it on all sides. The drum is mounted for rotation within cabinet 3 on a substantially horizontal axis, and is generally cylindrical in shape, having a first outer wall portion 4, second and third outer wall portions 5 and 6 located respectively adjacent the ends of the drum, a back wall 7, and a front wall 8. Outer wall portions 4, 5 and 6 are imperforate over their entire length so that the entire outer shell of the basket is imperforate; on the interior surface of central portion 4 there is provided a plurality of clothes tumbing ribs 9.

The front of drum 2 is rotatably supported within the outer casing 3 by means of a pair of idler roller wheels, one of which is shown by the numeral 10, which are rotatably secured to the top of an upwardly extending member 11 secured at its bottom to the case 12 of the machine. It will be observed that rollers 10 are disposed beneath the drum in contact with portion 6 thereof. The rear end of the drum receives its support from a roller wheel 13 which is positioned beneath portion 5 of the drum in supporting and frictionally driving engagement therewith.

Roller 13 is mounted on a shaft 14 supported in bearings 15. Shaft 14 is secured to a pulley 16 which is driven from a belt 17 in turn powered by a pulley 18 mounted on the shaft 19 of an electric motor 20. The motor, pulleys, and roller 13 are so proportioned to drum 2 and to each other that drum 2 is rotated by roller 13 at an appropriate speed to provide tumbling action for articles of clothing placed therein.

In order that a stream of drying air may be introduced into and passed through the clothes drum, the drum is provided with a central aperture 21 in its front wall 8 and a plurality of perforations 22 extending in an annulus around back wall 7. Fixedly secured to the rear wall 23 of casing 3 by any desired means such as, for instance, welding at suitable points 24, is a baffle member 25 which has secured thereto heating means 26 appropriately insulated from the baffle member. Heating element 26 may be annular in shape so as to be generally coextensive with the perforations 22 in drum 2. A baffle member 27 is rigidly secured to the back wall 7 outside the ring of perforations 22 and within the stationary baffle 25 so that an annular air inlet 28 is in effect formed by the two baffles 25 and 27. Baffle 27 is further provided with an annular series of openings 29; in this manner a passage is created for air to enter annular opening 28 between the baffles, pass over the heating elements 26, through openings 29 and then through perforations 22 into the interior of drum member 2.

In addition to the air guiding function, the baffles 25 and 27 help the rollers 10 and 13 to support the drum 2. Secured to the central portion 30 of baffle 27 is a bracket 31 to which in turn is secured a stub shaft member 32 arranged substantially coaxially with drum 2. The central portion of baffle 25 has an opening 34 formed therein in the shape of a slot. This slot is suitable formed (as more fully described in Patent 3,009,259, issued on November 21, 1961, to William F. Simpson and assigned to General Electric Company, assignee of the present invention) so as to permit stub shaft 32 a limited amount of movement in the vertical direction but virtually no movement in the horizontal direction. Thus, the slight vertical motions of the drum which result from the tumbling of the clothes can be accommodated while at the same time undesirable horizontal motion is affirmatively prevented by the engagement of stub shaft 32 and slot 34.

The front opening 21 of the drum is substantially closed by means of a stationary bulkhead generally indicated by the numeral 35. Bulkhead 35 is made up of a number of adjacent members including the inner surface 36 of an access door 37 mounted on the dryer cabinet, a stationary frame 38 for the door, the inner surface 39 of an exhaust duct 40, and an annular flange 41 mounted on the frame 38 and on the duct wall. It will be noted that a suitable clearance is provided between the inner edge of the drum opening 21 and the edge of bulkhead 35 so that there is no rubbing between the drum and the bulkhead during rotation of the drum. In order to prevent any substantial air leakage through opening 21 between the interior and the exterior of the drum a suitable ring seal 42 preferably formed of felt-like material is secured to flange 41 in sealing relationship with the exterior surface of drum wall 8.

Front opening 21, in addition to serving as part of the air flow path through the drum, also serves as a means whereby clothes may be loaded into and unloaded from the drum. The door 37, whose inner surface forms part of the bulkhead closing the opening, is mounted on cabinet 3 and when the door is opened clothes may be inserted into or removed from the drum through the door frame 38. It will be noted that the door includes an outer flat imperforate section 43 and an inwardly extending hollow section 44 mounted on the flat outer section. Hollow section 44 extends into the door frame 38 when the door is closed, and the door surface 36 which comprises part of the combination bulkhead 35 is actually the inner wall of the hollow section.

The air outlet from the basket is provided by a perforated opening 45 formed in the inner wall 36 of the hollow door section 44. The bottom wall section of door 44 and the adjacent wall of door frame 38 are provided with aligned openings 46 and 47, opening 47 providing the entrance to duct 40 as shown. A lint trap 48, which may comprise a fine mesh bag is preferably positioned in exhaust duct 40 at opening 47, the bag being supported by the door frame 38. Duct 40 leads to suitable air moving means which may, as shown, comprise a centrifugal blower 49 mounted on the motor shaft and thus driven by motor 20. The outlet of blower 49 communicates in the conventional manner with an outlet (not shown) which leads to the exterior of cabinet 3 so as to pass out of the cabinet after use.

During operation of motor 20, the rotation of blower 49 causes air to be drawn into cabinet 3 from atmosphere through suitable openings such as, for instance, opening 50, through annular opening 28, over heaters 26, through openings 29 and perforations 22 into drum 2, across the drum, through perforated opening 45 and aligned openings 46 and 47 into duct 40, and through the blower 49 to the outlet duct back to atmosphere.

Figure 2:
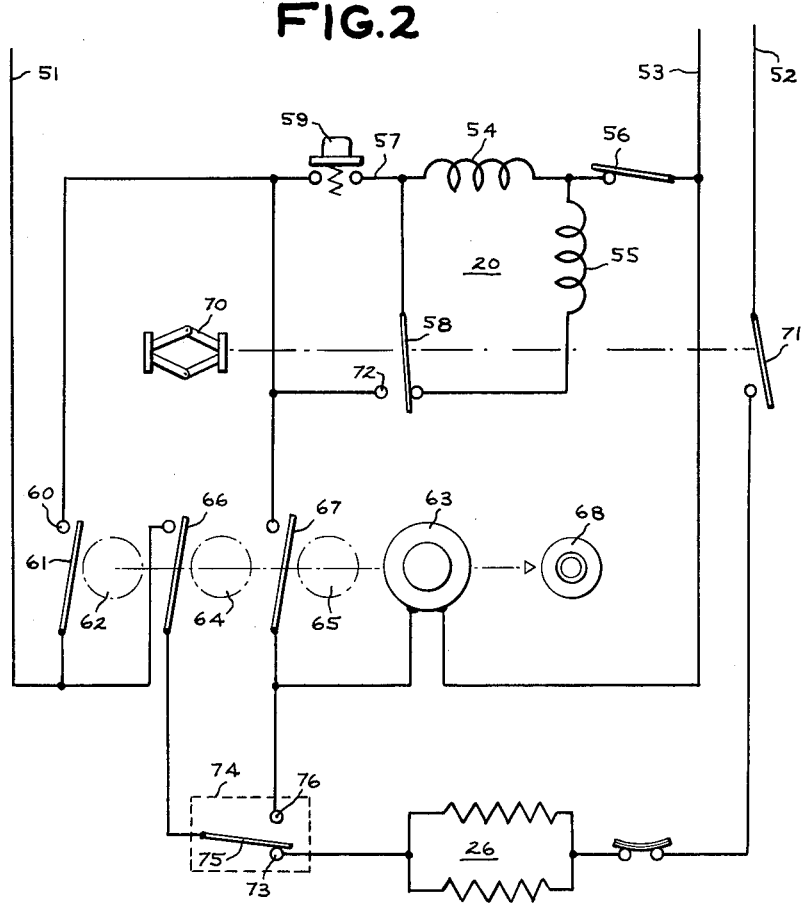
FIGURE 2 is a schematic illustration of my improved control circuit.

The operation of dryer 1 is controlled by my new and improved system shown in FIGURE 2. The entire control system of the machine is energized across a three-wire power supply system including supply conductors 51 and 52 and the neutral conductor 53. For domestic use the conductors 51 and 52 will normally be connected across a 220 volt power supply, with 110 volts appearing between the neutral line 53 and each of the supply conductors.

The drive motor 20 includes a main winding 54 and a start winding 55 which are connected in parallel with each other between the supply conductor 51 and neutral conductor 53. Specifically, the circuit, starting at neutral conductor 53, passes first through a conventional door switch 56 of the type which is closed when door 37 is closed and is open when the door is opened. The circuit then extends to the windings 54 and 55 in parallel with each other. Winding 54 is directly connected to a conductor 57, while winding 55 is connected to conductor 57 through a centrifugal switch member 58 which is shown in its position of rest.

Conductor 57 includes a push button switch member 59 which is biased to an open position, and terminates in a contact 60 engageable by a switch arm 61 connected to supply conductor 51. It will be understood that switch arm 61 is conventionally controlled by a cam 62 which in turn is connected to be rotated by a timer assembly 63, ordinarily made up of a motor and gear reduction assembly.

In addition to cam 62 the timer assembly 63 also drives an additional pair of cams 64 and 65 which respectively control switches 66 and 67. In addition to being rotatable by timer assembly 63, the cams 62, 64 and 65 may be manually positioned by suitable manual means 68, schematically shown in FIGURE 2 and conventionally carried on the backsplash panel 69 shown in FIGURE 1.

Switch arm 58 is under the control of a centrifugal member schematically shown by the numeral 70 secured to rotate with the rotor (not shown) of motor 20. In addition to switch arm 58, centrifugal mechanism 70 controls a second switch arm 71. When the rotor is at rest, or is rotating below a predetermined speed, the switch arms 58 and 71 are in the position shown. However, as the motor comes up to speed, the switch arms are moved to the left by the centrifugal mechanism 70. As a result, switch arm 58 is disengaged from start winding 55 and moves into engagement with a contact 72. Also, switch arm 71 closes to provide connection of the heating element 26 to supply conductor 52.

As the motor comes up to speed, and switch arm 58 moves into engagement with contact 72, an energizing circuit for main winding 54 is completed independently of pushbutton 59. This is effected, starting at the winding 54, by a circuit which passes through the contact arm 58, contact 72, contact 60, contact arm 61, and conductor 51. Thus, when the motor 20 comes up to speed and pushbutton 59 is released, the motor continues to run on winding 54 alone through the circuit described, with parallel start winding 55 disconnected. Also, it will be seen that the heater 26 may be energized when the motor has come up to speed as a result of the closing of contact arm 71, but may not be energized when motor 20 is not operating because contact arm 71 is open.

Heater 26 is connected to a contact 73 of a main control thermostatic assembly 74. This main control thermostate has an element positioned so as to sense a temperature proportional to that of the clothes. A suitable position for effecting this is shown in FIGURE 1, wherein the control thermostat 74 is shown as being positioned on the front of the bulkhead 35 directly below the air outlet 45 from the drum. Thermostat 74 is thus effective to sense the temperature of the exhaust air leaving the drum, which temperature is quite close to the actual clothes temperature.

The thermostat 74 has a normal low temperature position in which its contact arm 75 is in engagement with contact 73 as shown, and at a relatively high temperature the contact arm trips to a position in which it is in engagement with a contact 76. In the tripped position, the circuit for the heater is open, and accordingly the clothes start to cool; at a predetermined lower temperature, the contact arm 75 of thermostat 74 resets back to the position shown in which it enables energization of heater 26. The energizing circuit for heater 26, when contact arm 75 is in engagement with contact 73, is as follows: starting at conductor 52, the circuit extends through contact arm 71, the heater 26, contact 73, contact arm 75, and timer switch 66 to supply conductor 51. In this manner, the heater 26 may be energized across the full 220 volt source of power.

When the thermostat 74 trips so that contact arm 75 moves into engagement with contact 76, the energizing circuit for heater 26 is opened so that the heater ceases to operate. Engagement of contact arm 75 with contact 76 completes an energizing circuit for timer assembly 63 as follows: starting with the neutral conductor 53, the circuit passes through the timer assembly 63, contact 76, contact arm 75, and timer operated switch 66 to supply conductor 51. It will be seen that the completion of this energizing circuit for the timer assembly 63 and the completion of the energizing circuit for the heater 26 are alternative in nature. That is, either one or the other is completed depending upon whether the thermostat is in its normal position or is in its tripped position.

It will be seen that when switch 67 is opened, the various energizing circuits may nonetheless be completed in the manner described above since none of them utilizes this particular switch for an automatic drying cycle. However, when the switch 67 is closed, there is an additional energizing circuit completed for motor 20. Starting at contact 72, this energizing circuit may be provided through switch 67, contact 76, contact arm 75 of the thermostat 74 when the thermostat is in its tripped position, timer switch 66, and supply conductor 51. It will be seen that this circuit differs from the first motor energizing circuit in that it bypasses the timer operated switch 61 but is dependent upon a tripped condition of thermostat 74.

Figure 3:
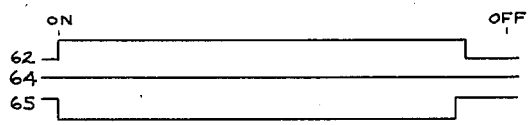
FIGURE 3 is a developed view of part of the surfaces of the cams shown in FIGURE 2, illustrating an automatic drying cycle which may be provided with the circuit of FIGURE 2.

Referring now to FIGURE 3, there is shown a development of each of the cams 62, 64, and 65 with the "on" position representing the starting point for an automatic cycle, and with the "off" position representing the point beyond which the cycle cannot be extended longer. It will be observed that in the automatic cycle the cam 64 causes switch 66 to be closed all the time; therefore, for the automatic cycle to be described, this switch may be disregarded. The cam 62 causes switch 61 to be closed in order to permit initating an operation by the pression of the button 59, and remains closed until a brief period before the "off" position. Cam 65 causes switch 67 to be open during virtually the entire automatic operation, but closes near the end, sufficiently soon with relation to the operation of switch 61 to insure that there is continued energization of motor 20.

The period of time prior to the "off" position in FIGURE 3 at which cam 65 closes switch 67 is of prime importance in my inventive concept. This period is selected so as to be longer than the usual length of time taken by the thermostat 74, when there are substantially dry clothes in drum 2, to cool to its reset temperature from the relatively high temperature at which it trips contact arm 75 into engagement with contact 76. While this length of time is, of course, variable with the size of the clothes load, it is known to have fairly well asecrtained limits, and it is a matter of using simple and straightforward engineering principles to select the brief period so that it is slightly longer for virtually all loads than the length of time for the thermostat to cool sufficiently to trip back to its normal position.

For instance, in the machine having an automatic drying sequence which is produced for sale by applicant's assignee, the thermostat 74 causes contact arm 75 to trip into engagement with contact 76 at 155 degrees Fahrenheit, and permits it to snap back into engagement with contact 73 when the temperature decreases to 135 degrees. This has been found to take at least about 2½ minutes when the clothes are dry, and therefore a period of time of 4 minutes prior to the "off" position is selected for cam 65 to close switch 67.

With this arrangement, then, a drying operation may be started by turning the cams to the "on" position in FIGURE 3 and depressing button 59 to start the motor. The motor comes up to speed, and contact arms 58 and 71 move to the left so as to open the start winding, bypass button 59, and permit energization of heater 26. When the predetermined high trip temperature of thermostat 74 is reached, the arm 75 moves up into engagement with contact 76 and timer assembly 63 starts to rotate the cams and stops energization of the heater 26 until the clothes are cooled sufficiently to permit the arm 75 to move back to the position shown.

This sequence continues until the time is reached when switch 67 is closed by cam 65 and switch 61 is opened by cam 62. At this time, there is no apparent change in the operation of the machine since the motor continues to be energized: this is so because the necessary cam movement can occur only when the timer is running, and the timer can run only when the contact arm 75 engages contact 76. What this does do, however, due to the length of time for contact arm 75 to move back compared to the length of time left before the "off" position is reached, is to insure that prior to the "off" position, for virutally all circumstances, the temperature will cool to the point where arm 75 resets.

When contact arm 75 moves back to the position shown, it opens the energizing circuit for the motor through switch arm 67 since the completion of this circuit is dependent upon the contact arm 75 being in a tripped position of the thermostat. Since switch 61 has already been opened, this means that there is no energizing circuit for the motor completed, and therefore the motor ceases to operate. When the motor ceases to operate, switch arm 71 moves back to its open position and therefore energization of heater 26 also terminates.

Thus, the energization of all components of the machine is terminated at a time when the temperature of the clothes is at its lowest point, as determined by the fact that arm 75 has just moved back to its low temperature position in engagement with contact 73. A circuit is provided which, in addition to its automatic features, insures that the clothes may be removed by the operator from the machine immediately following operation at a reasonably low temperature facilitating the handling of the clothes.

Figure 4:
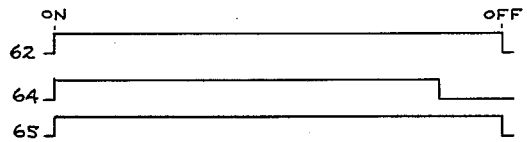
FIGURE 4 is a developed view of another part of the surface of the cams of FIGURE 2 for providing a timed drying operation.

It is to be noted, as a point in interest, that as shown in FIGURE 4 the same circuit of FIGURE 2 may also be utilized to provide a conventional timed circuit with a conventional timed cool-down if the operator so desires. Thus, the other half of each of the cams 62, 64 and 65 may be formed as shown in FIGURE 4. In this case, switch 61 is closed by cam 62 for the complete operation, and the opening of switch 61 causes the termination of the cycle. This is provided by causing the switch 67 to have the same operation as switch 61, that is, to be closed during the entire operation and opened at the same time that switch 61 is opened.

With this arrangement of switches 61 and 67 the timer continues to operate regardless of the position of contact arm 75. This results from the fact that an energizing circuit for timer 63 is completed, starting at supply conductor 51, through switches 61 and 67 to the timer assembly 63, and then to neutral conductor 53.

The opening of switches 61 and 67 also insures that the motor 20 will be de-energized at the same instant that timer assembly 63 ceases to operate, at the end of a timed operation. A timed cool-down period may be easily provided in this timed operation by causing cam 64 to open switch 66 several minutes before the end of the operation; this precludes energization of the heater 26 without affecting either timer 63 or motor 20.

Thus, my improved circuit which insures that the clothes will be at a relatively low temperature at the end of an automatic drying operation also provides for a conventional timed operation with a conventional cool down. The operator may select whichever type of operation is desired.

While in accordance with the Patent Statutes I have described what at present is considered to be the preferred embodiment of my invention, it will be obvious to those skilled in the art that various changes and modifications may be made therein without departing from the invention, and it is therefore aimed in the appended claims to cover all such equivalent variations as fall within the true spirit and scope of the invention.

What I claim as new and desire to secure by Letters Patent of the United States is:

1. A clothes dryer comprising
   (a) a chamber for receiving clothes to be dried;
   (b) air moving means for passing air into and out of said chamber;
   (c) an electric motor for operating said air moving means;
   (d) a heater upstream of said chamber for heating air passing into said chamber;
   (e) a timer assembly;
   (f) first and second motor circuits for energizing said motor;
   (g) a heater circuit for causing operation of said heater;
   (h) a timer circuit for causing operation of said timer assembly;
   (i) a control thermostat positioned to be responsive to the temperature of clothes in said chamber;
   (j) a heater switch and a timer switch both operated by said thermostat and enabling respectively operation of said heater and of said timer assembly during a drying operation, said thermostat opening said heater switch and closing said timer switch at a relatively high temperature of the clothes, and closing said heater switch and opening said timer switch at a lower temperature of the clothes;
   (k) a motor controlled switch responsive to motor operation and positioned in said heater circuit, said motor controlled switch closing during motor operation to enable operation of said heater and opening when said motor is not operating;
   (l) first and second switches controlled by said timer assembly and positioned in said first and second motor circuits respectively, said timer assembly closing said first switch throughout most of said timer assembly operation and opening said first switch a brief period before the end thereof, said timer assembly maintaining said second switch open throughout most of said timer assembly operation and closing said second switch when said first switch opens so as to maintain continued energization of said motor, said brief period being longer than the usual length of time taken by said thermostat to cool from said relatively high temperature to said lower temperature with substantially dry clothes in said chamber;
   (m) said timer switch being included in said second motor circuit in series with said second switch whereby said motor is deenergized when said first switch is open, said second switch is closed, and said timer switch is opened by said thermostat.

2. A clothes dryer comprising
   (a) a chamber for receiving clothes to be dried;
   (b) means for rotating said chamber on a non-vertical axis for tumbling clothes in said chamber;
   (c) an electric motor for operating said tumbling means;
   (d) a heater arranged to cause heating of the clothes in said chamber;
   (e) a timer assembly;
   (f) first and second motor circuits for energizing said motor;
   (g) a heater circuit for causing operation of said heater;
   (h) a timer circuit for causing operation of said timer assembly;
   (i) a control thermostat positioned to be responsive to the temperature of clothes in said chamber;
   (j) a heater switch and a timer switch both operated by said thermostat and enabling respectively operation of said heater and said timer assembly during a drying operation, said thermostat opening said heater switch and closing said timer switch at a relatively high temperature of the clothes, and closing said heater switch and opening said timer switch at a lower temperature of the clothes;
   (k) a motor controlled switch responsive to motor operation and positioned in said heater circuit, said motor controlled switch closing during motor operation to enable operation of said heater and opening when said motor is not operating;
   (l) first and second switches controlled by said timer assembly and positioned in said first and second motor circuits respectively, said timer assembly closing said first switch throughout most of said timer assembly operation until a brief period before the end thereof and then opening said first switch, said timer assembly maintaining said second switch open throughout said timer assembly operation and then closing said second switch when said first switch opens to maintain continued energization of said motor, said brief period being longer than the usual length of time taken by said thermostat to cool from said relatively high temperature to said lower temperature with substantially dry clothes in said chamber;
   (m) said timer switch being included in said second motor circuit and in series with said second switch whereby said motor is de-energized when said first switch is open, said second switch is closed, and said timer switch is opened by said thermostat.

3. The apparatus defined in claim 1 wherein said motor controlled switch is a speed responsive switch which is open when said motor is at rest and closes when said motor comes up to a predetermined speed.

4. A clothes dryer comprising:
   (a) a chamber for receiving clothes to be dried;
   (b) air moving means for passing air into and out of said chamber;
   (c) an electric motor for operating said air moving means;

(d) a heater upstream of said chamber for heating air passing into said chamber;
(e) a timer assembly;
(f) first and second motor circuits for energizing said motor;
(g) a heater circuit for causing operation of said heater;
(h) a timer circuit for causing operation of said timer;
(i) a control thermostat positioned to be responsive to the temperature of clothes in said chamber;
(j) a heater switch and a timer switch both operated by said thermostat and enabling respectively operation of said heater and said timer assembly during a drying operation, said thermostat opening said heater switch and closing said timer switch at a relatively high temperature of the clothes, and closing said heater switch and opening said timer switch at a lower temperature of the clothes;
(k) a motor controlled switch responsive to motor operation and positioned in said heater circuit, said motor controlled switch closing during motor operation to enable operation of said heater and opening when said motor is not operating;
(l) first and second switches controlled by said timer in said first and second motor circuits respectively;
(m) said timer switch being included in said second motor circuit in series with said second switch, whereby said motor is de-energized when said first switch is open, said second switch is closed, and said timer switch is opened by said thermostat.

References Cited by the Examiner
UNITED STATES PATENTS

| | | | |
|---|---|---|---|
| 2,807,899 | 10/1957 | Dunkelman | 34—45 |
| 2,878,579 | 3/1959 | Fuchs | 34—45 |
| 2,887,785 | 5/1959 | Raley | 34—45 |
| 2,895,230 | 7/1959 | Reiley | 34—45 |

WILLIAM F. O'DEA, *Primary Examiner.*

NORMAN YUDKOFF, *Examiner.*